(12) United States Patent
Czerlewitz et al.

(10) Patent No.: US 12,021,418 B2
(45) Date of Patent: Jun. 25, 2024

(54) ELECTRIC MACHINE

(71) Applicant: Schaeffler Technologies AG & Co. KG, Herzogenaurach (DE)

(72) Inventors: Mike Czerlewitz, Bühl (DE); Christian Silvery, Walzbachtal (DE); Matthias Kästle, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 330 days.

(21) Appl. No.: 17/606,184

(22) PCT Filed: Mar. 26, 2020

(86) PCT No.: PCT/DE2020/100242
§ 371 (c)(1),
(2) Date: Oct. 25, 2021

(87) PCT Pub. No.: WO2020/216400
PCT Pub. Date: Oct. 29, 2020

(65) Prior Publication Data
US 2022/0181951 A1 Jun. 9, 2022

(30) Foreign Application Priority Data

Apr. 26, 2019 (DE) ...................... 10 2019 110 857.8
Aug. 6, 2019 (DE) ...................... 10 2019 121 188.3

(51) Int. Cl.
*H02K 3/28* (2006.01)
*H02K 3/52* (2006.01)
(Continued)

(52) U.S. Cl.
CPC ............... *H02K 11/25* (2016.01); *H02K 3/28* (2013.01); *H02K 3/522* (2013.01); *H02K 5/225* (2013.01); *H02K 2203/09* (2013.01)

(58) Field of Classification Search
CPC .... H02K 11/25; H02K 11/33; H02K 11/0094; H02K 11/05; H02K 3/522; H02K 3/50;
(Continued)

(56) References Cited

U.S. PATENT DOCUMENTS

| | | |
|---|---|---|
| 2014/0154933 A1 | 6/2014 | Miura et al. |
| 2018/0034346 A1 | 2/2018 | Purohit et al. |
| 2019/0363607 A1* | 11/2019 | Guntermann ......... F04B 39/121 |

FOREIGN PATENT DOCUMENTS

| | | |
|---|---|---|
| DE | 102010039340 A1 | 2/2012 |
| DE | 102017218473 A1 | 4/2019 |

(Continued)

*Primary Examiner* — Bryan R Perez
(74) *Attorney, Agent, or Firm* — Volpe Koenig

(57) ABSTRACT

An electric machine includes a stator having a winding, as well as at least one temperature sensor assembly having a temperature sensor section with a temperature sensor for detecting the temperature in the region of the winding. The ends of at least one part of the conductor on the inner circumference and/or on the outer circumference of the winding protrude axially or radially over the winding. An interconnection ring is placed axially or radially on the winding, which has at least one conductor bridge to which at least one portion of the ends are connected. A receiving section for the temperature sensor section is provided on the conductor bridge, in which the temperature sensor section is accommodated, thermally coupling the temperature sensor with the conductor bridge.

8 Claims, 3 Drawing Sheets

(51) Int. Cl.
*H02K 5/22* (2006.01)
*H02K 11/25* (2016.01)

(58) Field of Classification Search
CPC .. H02K 3/28; H02K 3/04; H02K 3/12; H02K 3/24; H02K 3/38; H02K 1/16; H02K 1/146; H02K 1/27; H02K 1/20; H02K 1/2791; H02K 5/225
See application file for complete search history.

(56) References Cited

FOREIGN PATENT DOCUMENTS

| | | | |
|---|---|---|---|
| DE | 102019103191 A1 | | 8/2020 |
| JP | 2008131775 A | * | 6/2008 |
| JP | 2008131775 A | | 6/2008 |
| JP | 2015053814 A | | 3/2015 |
| JP | 2016123155 A | | 7/2016 |

\* cited by examiner

ELECTRIC MACHINE

CROSS-REFERENCE TO RELATED APPLICATIONS

This application is the U.S. National Phase of PCT Appln. No. PCT/DE2020/100242 filed Mar. 26, 2020, which claims priority to DE 102019110857.8 filed Apr. 26, 2019 and DE 102019121188.3 filed Aug. 6, 2019, the entire disclosures of which are incorporated by reference herein.

TECHNICAL FIELD

The disclosure relates to an electric machine comprising a stator having a winding as well as at least one temperature sensor assembly having a temperature sensor section with a temperature sensor for detecting the temperature in the region of the winding.

BACKGROUND

Electric machines comprise a rotor and a stator and are used in different areas of application. The use of electric machines for electric hybrid vehicles and electric vehicles, or for hub drives is to be mentioned only as an example. If such an electric machine is used as a drive machine, it is usually designed as an internal rotor, i.e., the stator surrounds the internal rotor. A moving magnetic field is generated via the stator, which causes the rotor to rotate. For this purpose, the stator has a winding consisting of a large number of conductors, wherein the conductors are assigned to one or usually more than phase. The winding is guided around the stator teeth in a manner known per se.

Not only the number of phases is included in the design of the winding geometry, but also the number of wires per phase as well as the number of wires per slot within the stator toothing and the number of pole pairs. This variety of conductors and winding parameters creates a complex network of conductors that is built up using different winding technologies. Examples include hairpin or bar wave windings. Here, the conductors are formed by means of rods bent into a U-shape, which are put together to form a winding cage. The conductors are laid on a plurality of radial planes, wherein the conductors move from plane to plane, so to speak. To form these meandering, circumferential conductors, they are to be connected accordingly at their ends, which is usually done by welding the conductor ends that are adjacent to one another. The conductor ends converge at one point or on one winding side in the form of the so-called star, where they are connected to one another. In this region, the individual phases must also be connected to an external power supply, i.e., a power connection that is used to generate the magnetic field.

During the operation of the electric machine, the temperature of individual components must be monitored, for which purpose appropriate temperature sensors are used. One of the regions where the temperature is to be measured is the winding. For this purpose, the temperature sensor is installed inside the stator, which means that it usually has to be installed at an early stage of the production process. In order to measure the temperature in the winding area as accurately as possible, it is desirable to install the temperature sensor as close as possible to the winding or the winding head, since media flows in the interior, for example water, air, oil, etc., can impair the temperature measurement and the measurement therefore becomes inaccurate as the distance between the temperature sensor and the winding or the winding head increases. The arrangement of the temperature sensor, in particular on a particularly tightly or compactly wound winding such as a hairpin or bar wave winding, is particularly complicated.

SUMMARY

The disclosure is based on the problem of providing an electric machine which is improved in comparison.

To solve this problem, it is provided according to the disclosure in an electric machine of the type mentioned at the outset that the ends of at least one part of the conductor on the inner circumference and/or on the outer circumference of the winding protrude axially or radially over the winding, wherein an interconnection ring is placed axially or radially on the winding, which has at least one conductor bridge to which at least one portion of the ends are connected, wherein a receiving section for the temperature sensor section is provided on the conductor bridge, in which the temperature sensor section is accommodated, thermally coupling the temperature sensor with the conductor bridge.

According to the disclosure, the actual conductor interconnection, i.e., the connection of the individual conductors to form the corresponding phase-specific meander structures, and the interconnection for coupling with the power supply are to be separated via a high-voltage terminal. The interconnection ring is used for the actual conductor connection, i.e., a conductor ring that is placed separately on the winding and that, according to the disclosure, is placed axially or radially on the winding. This interconnection ring engages in the region of the conductor ends protruding axially or radially at the inner circumference and/or at the outer circumference of the winding. The conductor ends are assigned to the individual conductor sections, unless they are connected to one another on other, for example further inward, radial planes. The conductor ends are connected to one or more conductor bridges of the interconnection ring in a phase-specific manner, usually welded to it accordingly, so that the corresponding phase-specific conductor structures or conductor connections are generated via the interconnection ring.

To connect the winding to the power connection proper, various conductor ends associated with one phase are connected to a power connection located adjacent to the winding, preferably radially thereto, either directly or via intermediate connection conductors. The HV power connection comprises some phase-related terminals, which are connected to the conductor ends or via the connection conductors accordingly, also welded here.

The interconnection ring has one or more separate conductor bridges to which the ends of the conductors are connected. A conductor bridge, which is preferably a copper rail, is shaped accordingly so that it reaches the corresponding conductor ends to be connected. Such a conductor bridge allows easy bridging of corresponding distances in both circumferential and radial directions. For simple connection of the conductor bridge to the corresponding conductor ends, the conductor bridge or respectively each conductor bridge expediently has radially or axially protruding connection sections to which the ends of the conductors, which, since they protrude axially or radially from the winding, come to lie next to the connection sections in the assembly position, are welded. The interconnection ring is therefore designed as a star distributor.

According to the disclosure, it is now provided to integrate the temperature sensor close to the winding by arranging it on the interconnection ring and thermally coupling it there directly to a corresponding receiving section of the current-carrying and thus heating conductor bridge. The conductor bridge, preferably a copper rail as described, has a correspondingly shaped receiving section in which the temperature sensor section is arranged and in which it is preferably received in a form-fitting manner. This direct arrangement on the receiving section makes it possible to thermally couple the temperature sensor to the conductor bridge so that it detects the conductor bridge temperature. This means that direct detection is performed at a current-carrying and therefore heating winding element, so that measurement is possible directly in the temperature-sensitive region. The sensor can be ideally positioned for this purpose, so that a very accurate and reliable measurement is possible, especially since due to the contacting of the temperature sensor with the conductor bridge, which can also be referred to as a star carrier, a very good heat transfer is achieved between the conductor bridge and the temperature sensor, so that undesirable error influences and measured value deviations are reliably avoided. Due to the arrangement on the interconnection ring, the temperature sensor is also well protected against environmental influences so that, for example, no media flows such as water, oil, air, etc. can reach the temperature sensor directly.

According to a further development of the disclosure, the connection section is rounded or angular in cross-section, with the temperature sensor section having a shape-matched cross-section in the region to be arranged in the receiving section. This enables a quasi form-fitting or at least form-compatible arrangement of the temperature sensor section in the connection section, which is advantageous for a good thermal coupling.

Preferably, the receiving section is formed in extension of the connecting section of the conductor bridge. The conductor bridge extends a little way in the circumferential direction of the winding, which is quasi-cylindrical in basic shape. According to the disclosure, the receiving section is arranged as an extension of this slight arc shape, so that the temperature sensor section is also positioned as it were as an extension of this arc shape and can consequently be integrated in a space-saving manner.

As described, the conductor bridge itself is preferably a copper rail. This enables easy formation of the connection geometry on the conductor itself, as well as simple formation of the receiving section in its desired shape, for example rounded, etc., since the copper rail can be manufactured or shaped accordingly in a simple manner in a stamping and bending process.

The interconnection ring itself expediently has a housing in which the conductor bridge and the temperature sensor section are accommodated. This housing, which is preferably made of plastic, consequently encapsulates the conductor bridge and the temperature sensor section, so that the latter is once again encapsulated and thus protected via the housing itself, in addition to being arranged in the receiving section.

According to a particularly advantageous embodiment of the disclosure, the housing can consist of a potting compound, the conductor bridge together with the temperature sensor section being embedded in the potting compound. This means that the interconnection ring is effectively a plastic injection-molded component, i.e., it consists of the internal conductor bridge or bridges as well as the temperature sensor section and a housing in the form of a solid, injection-molded plastic component that completely encapsulates and embeds the internal elements. This potting allows an additional fixation of the temperature sensor section on the conductor bridge or, if no separate form-fitting fixation is provided, provides for the actual fixation.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
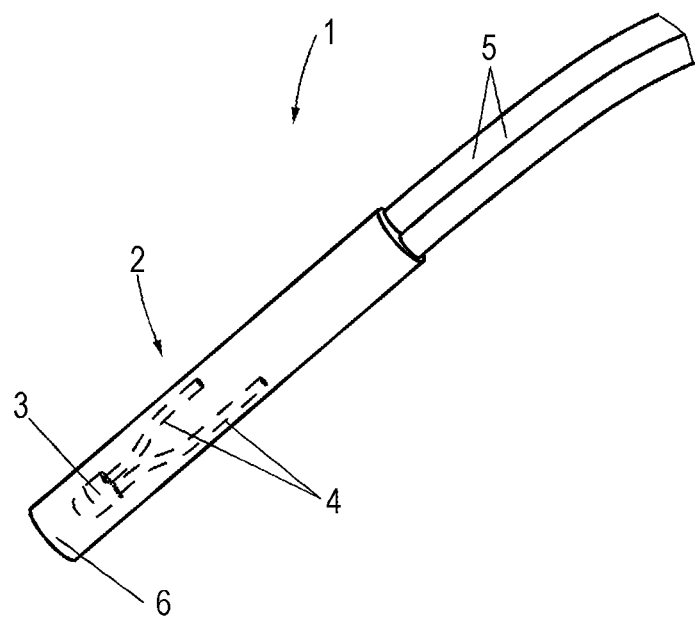
FIG. 1 shows a schematic diagram of a temperature sensor assembly.

FIG. 1 shows a schematic diagram of a temperature sensor assembly 1 for an electric machine according to the disclosure, as shown below in FIGS. 5 and 6. The temperature sensor assembly 1 has a temperature sensor section 2 with a temperature sensor 3 and connection conductors 4, via which the temperature sensor 3 is connected to sensor cables 5 that lead to a control or processing device not shown in further detail. The temperature sensor 3 and the connection conductors 4 can be fixed in position on a suitable sensor carrier. The temperature sensor section is covered with a shrink tube 6. In the example shown, it is an elongated, cylindrical structure, but if necessary it can also be rectangular in cross-section.

Figure 2:
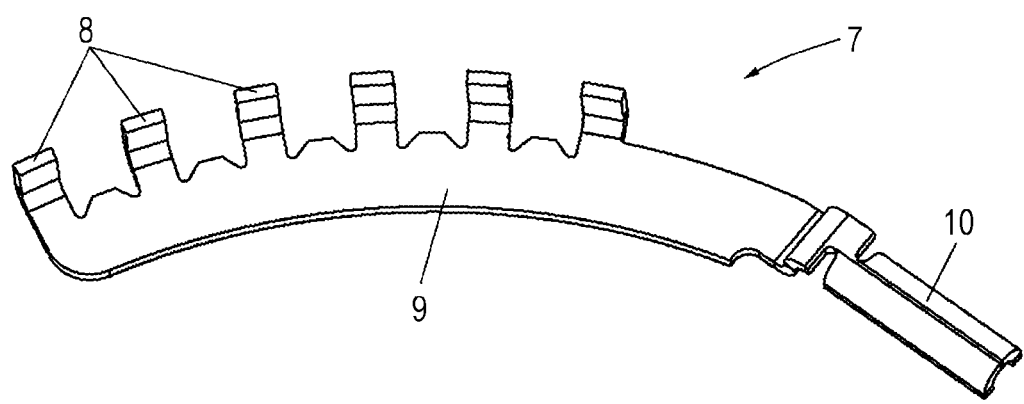
FIG. 2 shows a perspective view of a conductor bridge.

FIG. 2 shows a perspective view of a conductor bridge 7 in the form of a stamped and bent copper rail. It is of arcuate design and has a plurality of connection sections 8 which serve to connect to conductor ends of winding conductors of a stator winding, which will be discussed below.

Figure 3:
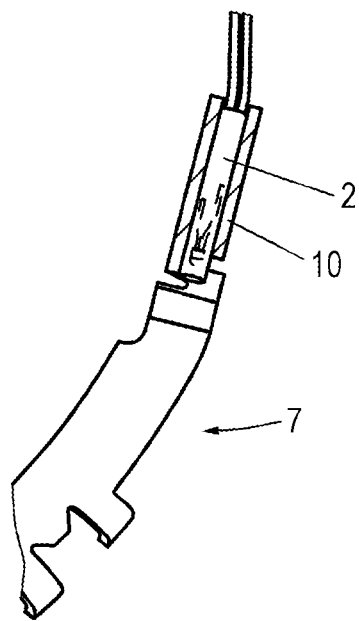
FIG. 3 shows the arrangement of the temperature sensor assembly on the conductor bridge.

At one end of the arcuate base section 9 of the conductor bridge 7, a receiving section 10 is formed for receiving the temperature sensor section 2, which, as FIG. 2 already indicates, is of semicircular design, i.e., it is adapted in shape to the shape of the temperature sensor section 2, so that the latter can be received therein in a quasi form-fitting manner. This is shown in FIG. 3, where the temperature sensor section 2 is received in the receiving section 10 in a quasi form-fitting manner and along its entire length. As a result of this accommodation, the temperature sensor 3 is thermally coupled to the receiving section 10 and thus to the conductor bridge 7, which, as a current-carrying element, heats up during operation of the electric machine, so that the conductor bridge temperature and thus also the winding temperature can be measured directly.

Figure 4:
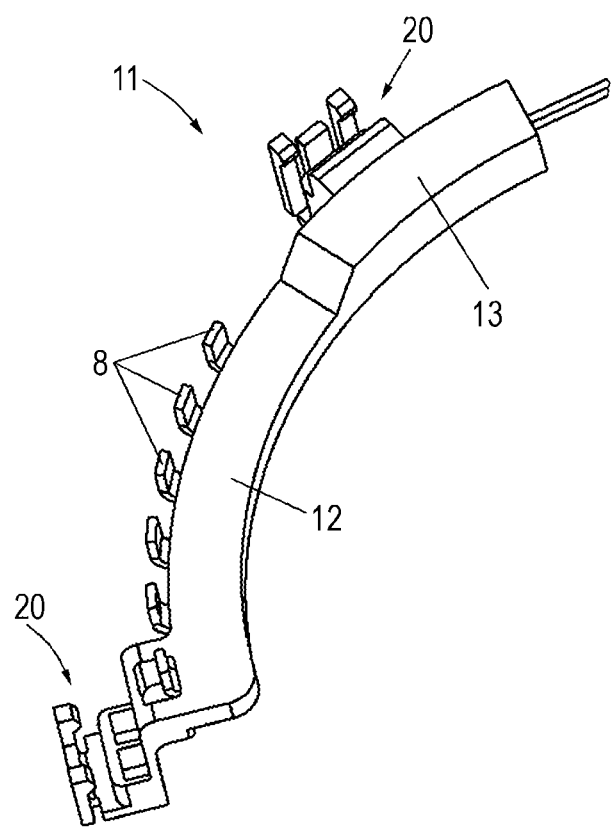
FIG. 4 shows an interconnection ring formed by overmolding the assembly from FIG. 3 to form a housing.

FIG. 4 shows a finished interconnection ring 11 in which the arrangement of conductor bridge 7 and temperature sensor assembly 1 or temperature sensor section 2 shown in FIG. 3 is embedded. The interconnection ring 11 has a housing 12 made of a plastic potting compound that embeds said components. Only the connection sections 8 protrude out to the side after the ends of the winding conductors are to be connected to them. Otherwise, the conductor bridge 7 and in particular the receiving section 10 with the temperature sensor section 2 is completely embedded in the terminal region 13 of the interconnection ring 11, with the temperature sensor section 2 being fixed to the receiving section 10 via the potting compound.

Figure 5:
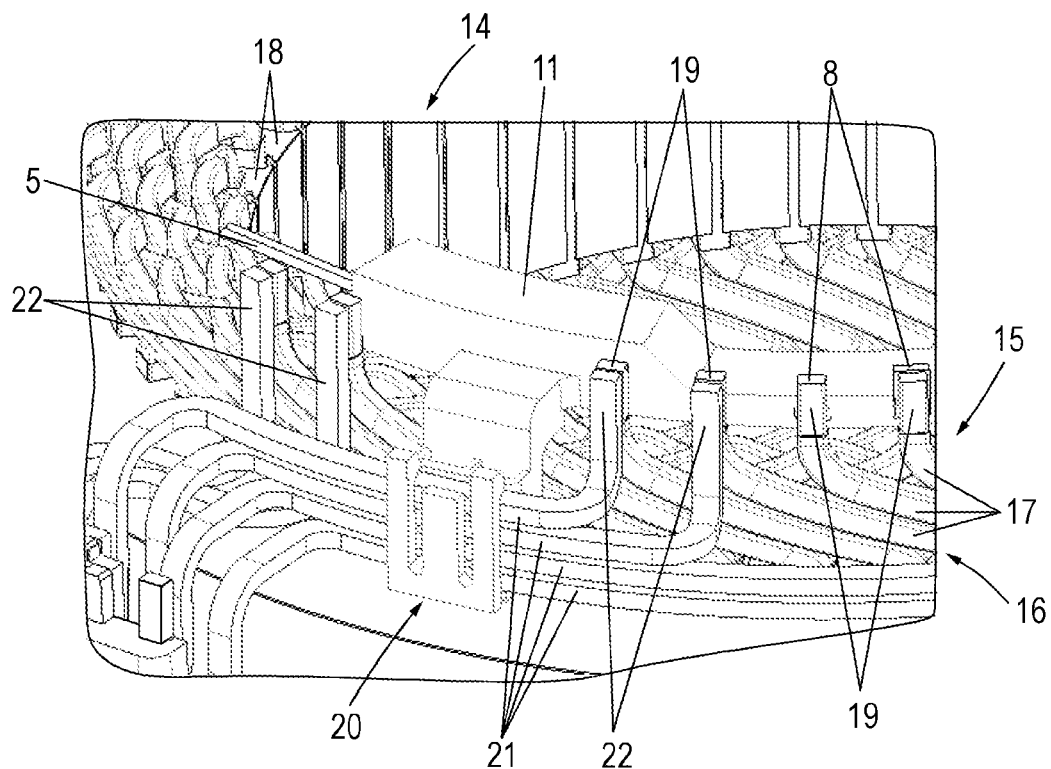
FIG. 5 shows a partial view of an electric machine according to the disclosure with an interconnection ring mounted on the winding.

FIG. 5 shows, in the form of a partial view, a schematic view of an electric machine 14 according to the disclosure, comprising a stator 15 with a winding 16 comprising a plurality of conductors 17, which are assigned to three separate phases, for example. Each conductor 17 is designed almost like a U-shaped bracket, wherein a plurality of such U-shaped conductors, often also called hairpins, are plugged together to form the winding 16, which can also be referred to as a winding cage. The plurality of conductors 17 define different radial planes, as basically shown in FIG. 6. For this purpose, the conductors 17 extend, depending on the winding diagram, from one radial plane to another radial plane, for example an adjacent radial plane, in the region in which they are connected to the conductor ends of corresponding adjacent conductors continuing the phase conductor.

The conductors 17 are guided or bent and laid in such a way that corresponding recesses result, which extend radially so that corresponding stator teeth 18 engage in these recesses or the corresponding conductors 17 are wound between the corresponding grooves of the stator teeth 18. The basic structure of such a stator 15 or a winding 16 wound from the separate brackets described is basically known.

In the stator 15 according to the disclosure, the ends 19 of the conductors 17, insofar as the ends 19 end here at the outer circumference of the annular winding 16, are axially protruding, that is, they protrude axially from the winding 16. These ends 19 are associated with individual conductors 17, which are to be connected via the interconnection ring 11 in accordance with the routing diagram. For this purpose, the interconnection ring 11 is placed axially on the face of the winding 16 so that the connection sections 8 are positioned correspondingly adjacent to the ends 19 of the conductors 17 so that they can be connected together by simple welding. However, the conductor bridge 7 is then also contacted accordingly and integrated into the winding 16 in a current-carrying manner.

Figure 6:
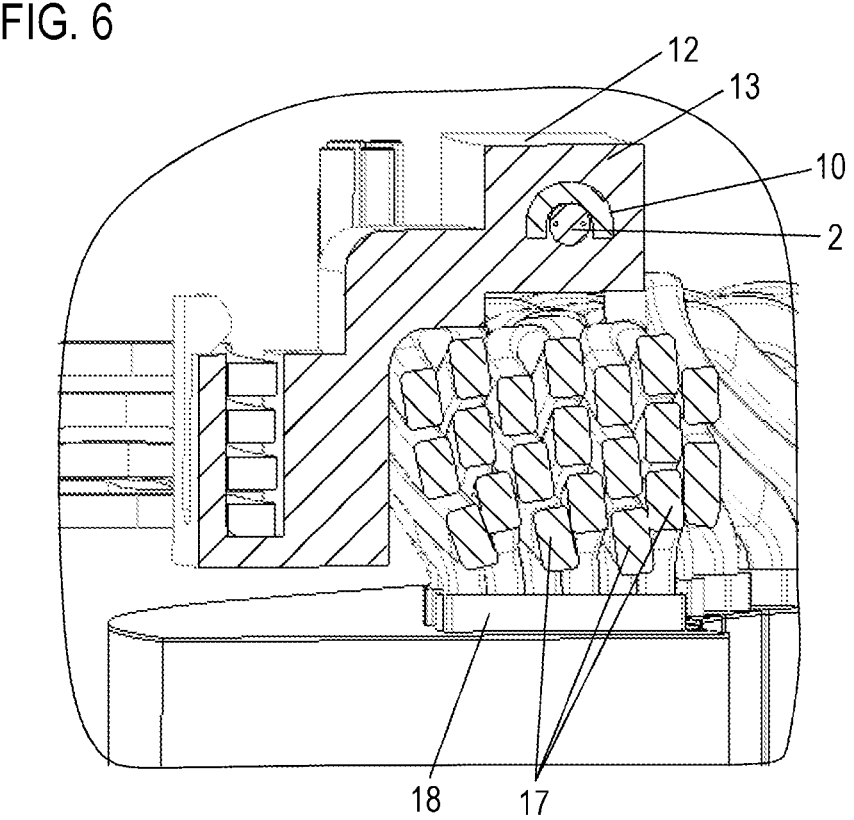
FIG. 6 shows a section view through the arrangement from FIG. 5.

A section view of the arrangement shown in FIG. 5 is shown in FIG. 6. The sectional plane passes through the region 13 in which the receiving section 10 and the temperature sensor section 2 are received. It can be seen that the two are firmly connected to one another and are in thermal contact, as is also clearly evident from the quasi form-fitting reception.

As FIG. 4 further shows, two retainers 20 are integrally formed on the housing 12 of the interconnection ring 11, which are designed as latching or clamping retainers and, see FIGS. 5 and 6, serve to receive a certain number of connection conductors 21, which connect further ends 19 of the conductors 17 in pairs, because they are assigned in a phase-specific manner, to a HV power connection, also referred to as HV terminal. Since the ends 19 protrude axially from the winding head, the corresponding connection ends 22 of the connection conductors 21 in accordance also run axially, as shown in particular in FIG. 5, so that here too the conductor ends can be easily connected by welding.

The connection conductors, which may also be referred to as conductor rails or bus bars, as they extend a certain distance around the circumference of the winding, are received and fixed in the corresponding retainer 20, of which there are two in the example shown, so that they are not subjected to excessive vibration during operation, but can nevertheless compensate for any vibrations.

LIST OF REFERENCE NUMBERS

1 Temperature sensor assembly
2 Temperature sensor section
3 Temperature sensor
4 Connection conductors
5 Sensor cables
6 Heat shrink tubing
7 Conductor bridge
8 Connection section
9 Base section
10 Receiving section
11 Interconnection ring
12 Housing
13 Region
14 Machine
15 Stator
16 Winding
17 Conductor
18 Winding
19 End
20 Retainer
21 Connection conductors
22 Connection end

The invention claimed is:

1. An electric machine comprising a stator having a winding, as well as at least one temperature sensor assembly having a temperature sensor section with a temperature sensor for detecting a temperature in a region of the winding, wherein ends of at least one part of a conductor on an inner circumference or on an outer circumference of the winding protrude axially or radially over the winding, wherein an interconnection ring is placed axially or radially on the winding, which has at least one conductor bridge to which at least one portion of the ends are connected, wherein a receiving section for the temperature sensor section is provided on the conductor bridge, in which the temperature sensor section is accommodated, thermally coupling the temperature sensor with the conductor bridge, wherein the interconnection ring includes one or more retainers for connection conductors, via which ends of the conductors are connected to a power connection.

2. The electric machine according to claim 1, wherein the receiving section is rounded or angular in cross-section and the temperature sensor section has a shape-matched cross-section in the region to be arranged in the receiving section.

3. The electric machine according to claim 1, wherein the receiving section is formed in extension of a bent base section of the conductor bridge.

4. The electric machine according to claim 1, wherein the conductor bridge is a copper rail.

5. The electric machine according to claim 1, wherein the interconnection ring has a housing in which the conductor bridge and the temperature sensor section are accommodated.

6. The electric machine according to claim 5, wherein the housing consists of a potting compound, the conductor bridge together with the temperature sensor section being embedded in the potting compound.

7. The electric machine according to claim 5, wherein the housing is made of plastic.

8. The electric machine according to claim 7, wherein the one or more retainers are integrally formed on the housing.

* * * * *